United States Patent [19]

Kinsley

[11] 4,455,237

[45] * Jun. 19, 1984

[54] HIGH BULK PULP, FILTER MEDIA UTILIZING SUCH PULP, RELATED PROCESSES

[75] Inventor: Homan B. Kinsley, Powhatan, Va.

[73] Assignee: James River Corporation, Richmond, Va.

[*] Notice: The portion of the term of this patent subsequent to Jun. 19, 2001 has been disclaimed.

[21] Appl. No.: 434,266

[22] Filed: Oct. 14, 1982

Related U.S. Application Data

[63] Continuation-in-part of Ser. No. 337,158, Jan. 5, 1982.

[51] Int. Cl.$^3$ .................. B01D 39/18; D21F 11/14
[52] U.S. Cl. .................................. 210/767; 55/97; 55/521; 55/524; 55/528; 55/DIG. 5; 162/23; 162/28; 162/142; 162/146; 210/493.5; 210/504; 210/505; 210/508
[58] Field of Search .............. 162/23, 28, 142, 146, 162/148, 149, 150, 165; 55/521, 524, 528, DIG. 5, 97; 210/493.5, 504, 505, 508, 767

[56] References Cited

U.S. PATENT DOCUMENTS

| | | |
|---|---|---|
| 2,008,892 | 7/1935 | Asplund . |
| 2,145,851 | 2/1939 | Asplund . |
| 3,388,037 | 6/1968 | Asplund et al. ............... 162/23 |
| 3,773,610 | 11/1973 | Shouvlin et al. .............. 162/19 |
| 3,808,090 | 4/1974 | Logan et al. ................. 162/23 |
| 3,948,449 | 4/1974 | Logan et al. ................. 241/41 |
| 4,009,835 | 3/1977 | Syrjanen ..................... 241/28 |
| 4,037,792 | 7/1977 | Peterson ..................... 241/18 |
| 4,136,831 | 1/1979 | Cederquist et al. ............ 241/18 |
| 4,145,246 | 3/1979 | Goheen et al. ................ 162/23 |
| 4,194,945 | 3/1980 | Malev et al. ................. 55/528 |
| 4,219,024 | 8/1980 | Patience et al. .............. 128/287 |
| 4,221,630 | 9/1980 | Selander et al. .............. 162/13 |
| 4,247,362 | 1/1981 | Williams ..................... 162/28 |

FOREIGN PATENT DOCUMENTS 720216 10/1965 Canada .

OTHER PUBLICATIONS

Charters, M. T., "Thermomechanical Pulpins", Paper Presented at Ninth European Meeting of Empire State Paper Research Associates Inc., San Remo, Italy, Apr. 22-23, 1974.
International Conference for Timber Utilization Paris 26-28 7/1937, on "The Influence of Defibration on the Properties of Wallboard", by Dr. W. Holst, Defibrator Co., Stockholm.
Pacific Pulp and Paper Industries, "Continuous Cooking and Defibration Process According to the Asplund Principle", by A. H. Lundberg.

*Primary Examiner*—William F. Smith
*Attorney, Agent, or Firm*—Mandeville and Schweitzer

[57] ABSTRACT

The disclosure related in part to a novel and highly superior high bulk pulp formed of lignin-containing fibers, and to process conditions for manufacture of the pulp. The process involves selection of a lignin-containing fiber source, having a lignin content of at least about 10%, and thermomechanically pulping the fiber source under temperature/pressure conditions of 300° F.–350° F./50 psig–120 psig and a refiner energy utilization of about 8–35 HPT/ADT, using a double disc, counter rotating disc refiner. The thermomechanically produced fibers are characterized by a high degree of stiffness, and an extremely smooth surface, free of fine fibril formation and thus substantially non-self-bonding. The new pulp has a wide variety of specialty uses which are attractive in terms of both economics and technical performance, because of the exceptionally high bulk and other distinctive characteristics of the fiber.

Novel and highly superior filter media, formed using the new pulp which filter media are particularly useful in the filtration of lube oil, fuel and air. The filter media are formed by a random lay-up of the lignin-containing fibers, typically with selected other pulp fibers having technical characteristics suitable for filter media utilization. Suitable lignin-containing fiber, produced under conditions of the invention, may be substituted with minimum effort for conventional technical fibers utilized in furnishes intended for filter media production. The new filter media are characterized by exceptionally high bulk, void volume and dust capacity-high critical characteristics of filter media, and provide equal or superior product performance at significant reductions in production cost and/or exceptional improvement in filtration performance at equivalent production cost.

15 Claims, No Drawings

HIGH BULK PULP, FILTER MEDIA UTILIZING SUCH PULP, RELATED PROCESSES

RELATED APPLICATION

This is a continuation-in-part of my copending U.S. patent application Ser. No. 337,158 filed Jan. 5, 1982.

BACKGROUND AND SUMMARY INVENTION

The present invention relates in part to a new technical grade thermomechanical pulp, which is characterized by an extremely high bulk characteristic and high resistance to degradation under paper-making conditions, while at the same time being extremely economical to produce and utilize. Because of these significant characteristics, the new pulp finds advantageous uses in a variety of specialty products. Additionally the invention pertains to novel filter media and to the use of such media for filtration, in particular for the filtration of air, fuel, or lube oil.

Thermomechanically produced pulp is a well known product in a general sense. It has been widely used for many years in the production of fiber board products, construction paper, newsprint, and other products. For example, in Asplund, U.S. Pat. No. 2,008,892, it is disclosed that thermomechanically produced pulp is useful for the production of wall board, insulation board and similar products, as well as cardboard. (See also Asplund U.S. Pat. No. 2,047,170.) U.S. Pat. No. 4,219,024, issued to Patience et al, discloses the use of thermomechanically produced pulp, as well as mechanically and semi-chemically produced pulp, in an absorbent article to capture body fluids, comprising a pad made of a mass of said fibers and particles of plastic material fused to the fibers in the pad to increase the integrity thereof.

In a thermomechanical pulping process, wood chips or other lignin-containing materials are generally placed under a steam atmosphere at elevated pressure. After preheating in the pressurized steam atmosphere, the wood chips are progressively introduced between a pair of rotating refiner discs while maintained under steam pressure. Depending upon the pressure of the steam, and the adjustment of the refiner discs, the wood chips are subjected to a controlled degree of abrasion to thereby reduce the chips to fibrous form. The fibers then issue from the peripheral region of the rotating disc refiner for further processing and utilization.

It has been known that under certain pressure/temperature conditions in a disc refiner, and certain energy level utilization during the refining process, there is a heat softening or thermoplasticity of the lignin within the fiber bundles. This brings about a weakening of the so-called middle lamella, such that the bonding force between adjacent fibers is greatly reduced and the individual fibers are easily separated without excessive damage and breakage. These original discoveries date back to the early 1930s and are reflected in, for example, U.S. Pat. No. 2,008,892 and U.S. Pat. No. 2,145,851, both issued to Asplund. Developments in equipment and techniques for the thermomechanical manufacture of pulp have of course continued since the pioneering efforts of Asplund. Examples of more recent efforts are the Shouvlin et al. U.S. Pat. No. 3,773,610, assigned to Bauer Bros. Co., Springfield, Ohio, and the Selander et al. U.S. Pat. No. 4,221,630.

Notwithstanding the more or less continuous development effort over the last 50 years or so in the art of thermomechanical pulp production and the utilization thereof, however, no one has heretofore discovered or recognized the truly exceptional high bulk characteristics of certain types of thermomechanically produced pulp fibers for use in the manufacture of fibrous filter media and the beneficial use of such filter media in processes of filtration.

It has now been discovered, however, that thermomechanically produced pulp fibers, produced under certain controlled conditions as specified herein, result in a pulp and fiber which is nearly a theoretical ideal for use in the manufacture of fibrous filter media and for other end uses wherein the high bulk and other desireable characteristics of the pulp are important. Such thermomechanically produced pulp fibers are far superior to ordinary chemical pulps utilized for these purposes, and indeed superior in many respects to the so-called high performance chemical pulps.

The new pulp is derived by the thermomechanical production in a disc refiner of pulp from lignin-containing source materials having a lignin content of at least about 10%. Under the conditions of the invention, the lignin-containing source material is processed under considerable steam pressure, in a range of about 50 psig to about 120 psig, at temperatures in the range of about 300° F. to about 350° F. Additionally, the disc refiner adjustments are such that, under the specified pressure/temperature conditions, there is an energy utilization in the fiber production of about 8 to about 35 Horse Power Days per Air Dried Ton (HPD/ADT) of the material. These conditions, as will be explained more fully hereinafter, enable the production of a technical grade pulp material which has a uniquely advantageous fiber structure for a variety of paper and board products in which low apparent density is one of the desirable attributes. In particular, the pulp has extraordinary advantages when incorporated in filter media.

Felted nonwoven materials are widely used in the manufacture of filter media, for example, such as automotive oil, air and fuel filters. Such filters are presently manufactured in large volume by conventional, wet paper-making processes, although air-laying is also a viable and potentially preferable manufacturing procedure. Ideal materials for filter media are bulky, porous, strong, stiff, resistant to heat and chemical degradation, and insensitive to water. The media also should have a desired average pore size for its intended function. These various desirable attributes can generally be controlled by varying the fiber furnish, the treatment of the fibers prior to forming, the manner in which the web is formed, and the post treatment of the formed web. The post treatment, for example, may include any or all of the following: pressing, drying, binder addition, and corrugation.

Physical characteristics of the fiber are of course highly significant. In this respect, experience indicates that ideal fibers should be relatively strong and stiff. They should also possess some degree of curl, yet be relatively non-bonding. Currently, chemical pulps are widely utilized in the production of fibrous filter media because the chemical pulps are characterized by a greater fiber length, higher individual fiber strength and stiffness, and a relatively large degree of fiber bonding when made into paper. By contrast, conventional ground wood pulps are very short, leading to a filter sheet which lacks desired strength and porosity, among other things.

Unfortunately, the most desirable grades of chemical pulps for use in the production of fibrous filter media are also extremely expensive. One such commercially available chemical pulp, i.e., a mercerized southern pine, forms the basis for a superior type of conventional filter sheet possessing a low level of fiber bonding, along with high porosity and high bulk. However, the chemical process for the manufacture of this pulp is rather comlex, and the yield of pulp is quite low, i.e., about 35% based on oven dry wood. Accordingly, this pulp is very costly. Some of the other chemical pulps, particularly flash dried kraft, are somewhat less costly but are correspondingly less satisfactory on a performance basis, and their use is limited to applications in which the performance specifications of the filter media are less demanding.

In accordance with one aspect of the present invention, a novel and greatly improved filter media is provided, as well as efficient processes of filtration utilizing same. The filter media of the present invention utilizes thermomechanically formed pulp in lieu of some or all of the content of high performance and other chemical pulps otherwise customarily utilized. Nevertheless, not only is there no significant loss in filter performance characteristics, but there is indeed an improvement in some of the more significant filter characteristics as a result of the substitution. Additionally, where the new filter media incorporates thermomechanically formed fibers in lieu of lower performance fibers, such as flash dried krafts, a significant performance benefit is realized in the use of the filter media in filtration processes.

The filters of the present invention are characterized by an exceptionally high dust capacity, high freeness, high void fraction and high bulk, all highly desirable characteristics of filter media. In many respects, the filters of the present invention exceed the performance characteristics of conventional filters using high performance chemical pulps. Moreover, the filters of the present invention are capable of achieving superior performance in a broad spectrum of filtration processes, and in particular, in processes for filtering air, lube oil, fuel or pharmaceuticals.

DETAILED DESCRIPTION OF PREFERRED EMBODIMENTS OF THE INVENTION

One of the fundamental aspects of the present invention is the production of a new technical grade of mechanical pulp under selected and controlled thermomechanical conditions. The pulp fibers derived from this pulping process have uniquely desirable characteristics for incorporation in filter media, for example, and in selected other end products in which a high bulk, low density structure is desirable. For convenience of reference, the pulp fibers so produced may be frequently referred to herein as lignin-containing fibers, as one of the characteristics thereof is that most of the original lignin content is retained in the final fiber.

It is believed that the source of the lignin-containing fiber is not specifically critical and may be taken from a wide variety of lignin-containing fibers, although some may, of course, be preferable to others. These sources include debarked wood (both softwood and hardwood varieties) and other lignin-containing materials, such as bamboo, bagasse, certain grasses and straws, and the like. For purposes of the invention, the fiber-forming material should have a lignin content of at least about 10% and preferably around 15% or more (most pulp woods have a lignin content in excess of 20%). At the present state of development, the preferred fiber source is debarked wood, either northern or southern softwoods or hardwoods, with some preference toward northern softwoods. Eucalyptus is also a preferred source of lignin-containing fiber.

In the case of debarked wood, after removal of bark, which is not used in the process, pulp wood logs are cut into chips, or some other reduced form, of a size suitable for thermomechanical processing. Desirably, the typical chip size is in the range of ⅜ inch by ¼ inch by ¾ inch, with the fibers aligned with the long axis of the chip. Of course, in any chipping process, the size and shape of the chips is highly randomized. Nevertheless, the objective is to seek a typical chip having a minimum dimension of about ⅜ of an inch and a maximum dimension of about ¾ of an inch, which can be reasonably approximated by screening of the chips through one inch maximum screen mesh and ⅛ minimum screen mesh.

The screened chips, typically after cleaning by a conventional water wash procedure, are reduced to pulp fibers following the general techniques of the Asplund U.S. Pat. No. 2,008,892, or the Shouvlin et al. U.S. Pat. No. 3,773,610, the disclosures of which are expressly incorporated herein by reference.

A first step in the process is generally the preheating of the chips by steam, and this is advantageously carried out in a vessel such as a horizontal tube digester. The digester, which is a conventional piece of equipment, may be provided at the inlet with a rotary valve or similar device (also conventional) for accommodating the in-feed of wood chips while maintaining the vessel under superatmospheric steam pressure.

In the process of the invention, lignin-containing material in reduced form of suitable size, e.g., as in the aforementioned sizes for wood chips, is preheated at a temperature not less than about 300° F. and more desirably at a temperature in the range of about 330° F. to about 350° F. This corresponds to a pressure range of about 50 psig to about 120 psig, with the preferred range being from about 90 psig to about 120 psig. Desirably, the wood chips are moved progressively through a partially filled (⅛ to ½) digester, while being continually agitated. This assures highly efficient heat transfer between the steam and the wood chips and a uniform preheating. Typically, a three minute retention time inside the horizontal tube digester is adequate, and this is believed to bring the inside of the chip to within about 10° F. of the steam temperature.

The preheated wood chips are then ground into pulp fibers in a disc refiner, while the chips are maintained in a pressurized steam atmosphere and in their substantially dry condition. Grinding is performed in a disc refiner of the general class disclosed in the before mentioned Asplund or Shouvlin patents. More specifically, however, a C. E. Bauer, No. 418 counter rotating 36 inch double disc refiner is a preferred piece of equipment for this purpose. This machine utilizes a pair of oppositely rotating 36 inch discs arranged in communication with the horizontal tube digester and arranged to receive preheated wood chips from the digester, (preferably under the same pressure conditions), in which case a pressure valve device is not required to be located between the digester and the disc refiner.

In accordance with generally known principles, when the wood chips are subjected to shear and abraded by the counter-rotating refiner discs, they are subject to further heating as a result of the energy input of the grinder itself. It is known that under certain conditions of preheating of the chips and operation of the disc refiner that the lignin content of the chips becomes softened and plasticized, thereby allowing easy separation of the individual fibers with minimum damage and destruction of the fibers. A desired degree of refining is controlled by adjustment of the peripheral gap between the refiner discs. In general, the narrower the gap, the more energy utilization that is required to refine the pulp and enable the fibers to emerge from the gap. Typically, such energy utilization is measured in Brake Horse Power Days per Air Dried Ton (HPD/ADT) of the raw material. For the production of pulp fibers according to the invention, ideally suited for the manufacture of filter media and other high bulk end products, it has been determined that the energy utilization in the disc refiner should be not less than about 8 HPD/ADT and not more than about 35 HPD/ADT. In many cases, achieving the desired energy levels requires setting of the gap at minimum size—virtually zero clearance, although for certain woods, such as southern softwoods, it may be desirable to widen the gap slightly in order to limit the energy to around 35 HPD.

After refining, the fibrous pulp is discharged from the refiner through a suitable blow valve or the like, which enables the fibrous material to be taken from a pressurized condition to a nonpressurized condition.

After the disc refining operation, the pulp fibers are generally mixed with sufficient water to derive a slurry of about 0.5 to 1% solids, suitable for screening of the fibers. In this respect, fibers produced according to the procedures outlined are significantly longer and stiffer than more conventional pulp fibers and are not readily screened on conventional pulp screens without excessive rejection of good fibers and unnecessary loss of yield. Because of the fiber characteristics of the pulp thus produced, it has been found to be desirable to utilize a rotary-type screen having slots aligned circumferentially (rather than axially as is more typical). A so-called "Ultrascreen" marketed by Black-Clawson is effective in the present process. Such a screen having a slot width of approximately six mils enables effective screening of the pulp with reliable rejection of shives and other foreign matter, yet without excessive rejection of good fiber.

Various pulp wood samples, processed under a variety of pressure-temperature conditions and refiner energy levels gave fiber characteristics as set forth in the following Tables I and II. These characteristics are compared with several commercial pulps in Table II.

TABLE I

| Run No. | 1 | 2 | 3 | 4 | 5 | 6 | 7 | 8 | 9 |
|---|---|---|---|---|---|---|---|---|---|
| Wood Type, NS = northern softwood NH = northern hardwood | NS | NS | NS | NS | NH | NH | NH | NH | NH |
| Refiner Conditions | | | | | | | | | |
| Steam; psig. | 50 | 90 | 90 | 60 | 50 | 90 | 90 | 90 | 90 |
| Temp; Deg. F. | 298 | 331 | 331 | 308 | 298 | 331 | 331 | 331 | 331 |
| Preheat Time; Min. | 3 | 3 | 3 | 3 | 3 | 3 | 3 | 3 | 3 |
| Plate Gap; in. | 0.007 | 0.000 | 0.000 | 0.000 | 0.012 | 0.010 | 0.000 | 0.005 | 0.004 |
| HPD/ADT | 27.3 | 12.9 | 16.2 | 64.4 | 11.1 | 13.7 | 29.9 | 20.7 | 18.6 |
| Freeness, CSF | 668 | 760 | 728 | 417 | 795 | 785 | 726 | 759 | 765 |
| % Shives, (Somerville) | 4.9 | 3.7 | 2.2 | 1.4 | 47.9 | 7.6 | 0.7 | 2.2 | 3.2 |

| Run No. | 10 | 11 | 12 | 13 | 14 | 15 | 16 | 17 | 18 | 19 |
|---|---|---|---|---|---|---|---|---|---|---|
| Wood Type, NS = northern softwood NH = northern hardwood | NS | NS | NS | NS | NH | NS | NH | NH | NH | NH |
| Refiner Conditions | | | | | | | | | | |
| Steam; psig. | 50 | 15 | 120 | 90 | 50 | 90 | 15 | 120 | 90 | 90 |
| Temp; Deg. F. | 298 | 250 | 350 | 331 | 298 | 331 | 250 | 350 | 331 | 331 |
| Preheat Time; Min. | 3 | 3 | 3 | 3 | 3 | 3 | 3 | 3 | 3 | 3 |
| Plate Gap; in. | 0.000 | 0.000 | 0.020 | 0.005 | 0.000 | 0.005 | 0.000 | 0.000 | 0.007 | 0.006 |
| HPD/ADT | 48.1 | 46.0 | 8.0 | 24.2 | 42.9 | 17.8 | 51.0 | 18.0 | 18.9 | 17.9 |
| Freeness, CSF | 684 | 683 | 764 | 756 | 669 | 753 | 579 | 762 | 757 | 770 |
| % Shives (Somerville) | 0.9 | 13.6 | 2.2 | 1.2 | 2.6 | 3.8 | 5.3 | 0.8 | 1.9 | 4.3 |

TABLE II

| Physical Properties of Unbeaten Pulp | | | | | | | | | | |
|---|---|---|---|---|---|---|---|---|---|---|
| Run No. | 10 | 11 | 12 | 13 | 14 | 15 | 16 | 17 | 18 | 19 |
| Tappi Brightness | 47.6 | 49.1 | 27.8 | 38.4 | 39.6 | 35 | 41.7 | 29.3 | 34.6 | 33.5 |
| Fiber Classification | | | | | | | | | | |
| % on 14 mesh | 46.7 | 40.3 | 45.8 | 34.5 | 4.4 | 42.7 | 7.2 | 1.2 | 1.9 | 4.7 |
| 28 | 19.1 | 23.4 | 26.2 | 24.2 | 9.6 | 16.9 | 12.6 | 5.2 | 7.2 | 10.3 |
| 48 | 13.0 | 16.3 | 14.4 | 13.9 | 33.6 | 14.5 | 30.1 | 37.0 | 41.6 | 35.7 |
| 100 | 4.5 | 4.0 | 3.2 | 3.2 | 15.6 | 4.0 | 13.1 | 24.8 | 22.5 | 20.5 |
| 200 | 4.4 | 5.3 | 3.3 | 3.7 | 12.3 | 3.7 | 12.8 | 16.1 | 13.7 | 13.7 |
| % thru 200 mesh | 12.3 | 13.4 | 7.1 | 20.5 | 24.5 | 18.2 | 24.2 | 15.7 | 13.1 | 15.1 |
| Weighted Av. Fiber Length, mm | 1.7 | 2.9 | 3.1 | 2.8 | — | 3.1 | 0.8 | 1.0 | 0.9 | 0.9 |
| Fiber Diameter, mm | 0.033 | 0.034 | 0.050 | 0.048 | — | 0.039 | 0.022 | 0.019 | 0.023 | 0.020 |

| | Westvaco Bleached S. Pine Kraft Pulp | Westvaco Bleached Southern Hardwood Pulp | JR Berlin Bleached Northern Softwood Kraft Pulp | JR Berlin Bleached Northern Hardwood Kraft Pulp | Allied Bleached S. Pine Kraft Pulp | Buckeye HPZ Southern Pine Mercerized Alpha Kraft Pulp | Buckeye 512 Cotton Linter Pulp Bleached |
|---|---|---|---|---|---|---|---|
| Fiber Classification | | | | | | | |
| % on 14 mesh | 53.8 | 0.6 | 45.76 | — | 52.4 | 38.8 | 19.8 |
| 28 | 19.2 | 14.2 | 23.3 | — | 14.8 | 17.7 | 22.0 |
| 48 | 13.5 | 31.7 | 10.4 | — | 10.6 | 14.6 | 26.6 |

TABLE II-continued

| | Physical Properties of Unbeaten Pulp | | | | | | |
|---|---|---|---|---|---|---|---|
| 100 | 6.3 | 22.0 | 7.6 | — | 7.3 | 4.6 | 15.5 |
| Total retained % | 92.8 | 68.5 | 87.1 | — | 85.1 | 75.7 | 86.2 |
| Thru 100 % | 7.2 | 31.5 | 12.9 | — | 14.9 | 24.3 | 13.9 |
| Weighted Av. Fiber Length, mm | 3.1 | 1.0 | 2.9 | 0.8 | 3.3 | 2.8 | 2.2 |
| Fiber Diameter, mm | 0.031 | 0.015 | 0.041 | 0.023 | 0.038 | 0.030 | 0.018 |
| Freeness CSF | 740 | 718 | 688 | — | 758 | 728 | 424 |

Electron photomicrographic studies were made of selected samples of the pulp woods processed as set forth in Table I. These were compared against conventional, commercial pulps known to be advantageous for utilization in the production of filter media. The latter included flash dried Westvaco pine, flash dried Westvaco hardwood, Buckeye "HPZ", Buckeye 512 cotton linters, JR-Berlin Bleached kraft softwood and hardwood (not flash dried). The Westvaco products are sold by Westvaco under the commercial characterization "Pinnacle Prime" softwood and "Pinnacle Prime" hardwood. "HPZ" is a commercial characterization for a high quality mercerized southern pine alpha pulp by Buckeye Cellulose.

In the examination of fibers produced under the pulping conditions of Table I, a spectacular difference in fiber surface was observed in both hardwood and softwood pulps as the steam pressure used in preheating was increased. At low steam pressures (15 psig) the process yielded a fiber having a large amount of fine structure. Parts of the cell walls were peeled from the fiber surface, fibers were rough surfaced, and fibrils could be observed that bonded one fiber to another. As steam pressure was increased to about 50 psig, a change in the surface structure development was observable, i.e., there was less fine structure which bonded the fiber together. The pulps made at 90 psig steam pressure were absolutely smooth walled. Even at 800X magnification there was no fibrils, no hint of surface development and the fiber surface appeared undamaged. Pulps made at 120 psig steam pressure were free of the fine surface structure development that was apparent at 15 psig, but there was an indication that softwood fibers may have been damaged (although filter sheets produced therefrom appeared to have excellent filter qualities). Some of the softwood fibers at 120 psig were actually split open to reveal the lumen. The walls, nevertheless, possessed a smooth, non-bonding appearance, as was observed in fibers produced at 90 psig steam pressure. Hardwood pulps produced at 120 psig did not have the appearance of possible damage as did the softwood pulp. Indeed, they looked more or less the same as those fibers produced at 90 psig.

In the case of JR-Berlin hardwood and softwood pulps, as well as Allied softwood pulp, the fibers had a ribbon-like appearance and tended to collapse when dried so that one fiber bonded to another. By way of comparison, under high magnification, the fibers produced in accordance with the present invention tended to look like "uncooked spaghetti" while the more conventional kraft fibers had an appearance of "cooked spaghetti". Even though the conventional kraft pulps had not been refined, there was evidence of surface fine structure fibrils which bonded one fiber to another.

The Westvaco hardwood and softwood pulps, under high magnification, had the appearance of "kinky ribbons". The Westvaco fibers collapsed, like the JR-Berlin and Allied fibers, but there appeared to be little bonding between fibers. Fibers made under the conditions of the invention looked like rigid, straight rods as compared to the Westvaco fibers. The latter had a radius of curvature of the "kinky" portion which appeared to be on the same order of magnitude as the fiber diameter itself, which was an unusual characteristic.

The Buckeye "HPZ" fibers, which are generally regarded as the highest quality of commercially available pulp for filter media purposes, appeared to be in the form of curly rods. The radius of curvature of the curls was much greater than that of the "kinks" present in the Westvaco fiber. The "HPZ" fiber had an observable fine structure which was noted, however, to be relatively rigid and non-bonding. Photomicrographs of the Buckeye 512 cotton linter pulp showed the presence of "curly rods" with a surprisingly large amount of fibrils present, which tended to bond the fibers together. The fibers themselves were not flexible enough to bond, as in the case of the kraft pulps, but the fine structure was flexible enough to contact and bond adjacent fibers.

In general, fibers produced under the conditions of the invention were more rigid and less conformable than the kraft fibers. Those made under the higher steam pressure conditions were very smooth surfaced. In physical appearance, fibers produced under the conditions of the invention looked more like the Buckeye "HPZ" than any of the other pulp fibers studied. Accordingly, as will appear hereafter, in filter media products in which fibers produced under the conditions of the invention were substituted for "HPZ" fibers, corresponding or better filter performance was achieved in a filtration process. This is remarkable, indeed, considering that fiber yield for pulp produced under the conditions of the present invention is significantly higher than the yield in the production of high performance chemical pulps such as "HPZ".

In the production of pulp for end use in filter media, perhaps the most significant specification is freeness, which is a conventional measure of the openess of the structure of the pulp fibers. In this respect, pulp produced in accordance with the conditions required by the process of the present invention has exceptional freeness, approximating 760±15 ml (CFS). This compares most favorably with the typical freeness value of about 750 for Buckeye "HPZ", a superior grade but costly, commercially available filter pulp.

In the manufacture of conventional filter media, frequently produced in the form of a continuous web of material, it is typical and usually desirable to combine two or more pulps in order to obtain a combination of desirable characteristics in the end product. This is also true of improved filters made utilizing lignin-containing pulp fibers made in accordance with the specified conditions of the invention. In this respect, one of the characteristics of a good filter fiber is its relatively non-bonding character, which tends to result in low tensile strength in the end product. Accordingly, it is advantageous to combine the lignin-containing pulp fibers of the invention with more conventional, relatively low cost flash dried kraft pulps for additional tensile strength. The finished web is, in any event, typically impregnated to some degree with a binder resin (typically phenol-formaldehyde) which produces effective fiber bonding without filling the interstices of the media itself.

Although it is contemplated that filter media using the lignin-containing fibers of the invention may be produced using, for example, air-laying techniques, most filter webs currently are produced by more conventional web paper-making processes. To use this end, it is common for the several pulps to be combined together in a beater to achieve a uniform mixture before the fiber slurry is laid on a paper-making screen. The new pulp fiber produced under conditions of the invention is highly advantageous in this regard, as the fibers, in addition to having a high degree of stiffness, and strong and tough, and little affected by water, whereas the commercially available fibers, which initially may be somewhat equivalent in desirable properties, are highly brittle and subject to severe degradation in the beating process. Although as a practical matter a relatively few minutes of beating time may be adequate, typical mill practice usually results in a greater-than-necessary amount of beating time with resultant product degradation. This is a particularly serious matter in connection with the use of a pulping product such as "HPZ", which is seriously degraded in its performance characteristics by the usual beating operations.

Likewise, after initial forming of the filter web, it is desirable occasionally for the web to be pressed before impregnation. This can also degrade high performance chemical pulps and can cause undesirable densification of webs produced with less costly kraft pulps. On the other hand, such pressing has relatively little effect on the lignin-containing fibers produced under conditions of the invention or on the density of pulps produced under the conditions required by the invention.

Thus, among the important advantages of the use of selected lignin-containing fibers produced under the conditions of the invention in a filter web material is its ability to withstand the preliminary beating and pressing operations without significant degradation and without significant densification. More conventional high performance pulp fibers are susceptible to one or both of these shortcomings.

Filter media incorporating significant percentages of lignin-containing pulp fibers produced according to the conditions of the invention exhibit markedly superior "dust capacity" than corresponding filter media using conventional pulps, including even the high performance chemical pulp. This is a function of the very high freeness of the pulp and the correspondingly low apparent density.

As reflected in Tables I and II, pulp freeness is markedly affected by steam pressure conditions during preheating and refining. Below 50 psig, freeness characteristics (CFS) are well below 700 and shive content is relatively high, whereas pulp produced under conditions of 90 and 120 psig had freeness characteristics of greater than 750 and as high as 770 and minumum shive content. Pulp possessing these outstanding freeness values, combined with the stiffness, toughness and non-bonding characteristics, can result in a superior filter media having a very high bulk and correspondingly high dust capacity.

By way of example, test sheets were prepared with several commercially significant pulps used in the production of filter media, including JR-Berlin softwood kraft, Buckeye "HPZ" and Alpha Pulp, such as "Placetate" marketed by ITT-Rayonier. All sheets were beaten for five minutes to stimulate mill conditions, but were unpressed. Table III below indicates values for basis weight in pounds per 3000 sq. ft.; web caliper in mils; dust capacity in grams per kilogram; tensile strength in pounds per inch; and void fractions.

TABLE III

| Single-Pulp Sheets, Unpressed, Beat Five Minutes | | | | |
|---|---|---|---|---|
| | (Sheet of Ivention) | Buckeye "HPZ" | Alpha Pulp | JR-Berlin Softwood Kraft |
| Basis Weight | 65 | 65 | 60 | 65 |
| Caliper (mils) | 0.040 | 0.019 | 0.020 | 0.016 |
| Dust Capacity (g/kg) | 3367 | 732 | 952 | 29.3 |
| Tensile Strength | 1 | 1 | 2 | 16 |
| Void Fraction | 0.89 | 0.83 | 0.85 | 0.75 |

As will be readily evident, the dust capacity of a filter sheet made in accordance with the teachings of the present invention is markedly superior to the dust capacity of sheets made from any of the other fibers. This particularly significant since dust capacity is directly related to the useful life of a filter. For example, it is contemplated that an automobile engine oil filter using filter media produced in accordance with the invention may realistically have a useful life of 50,000 miles.

Another notable feature of filter media manufactured in accordance with the invention and evident from Table III is the extremely large caliper or bulk of the filter sheet of the invention. It is approximately twice the caliper of sheets made with high performance chemical fibers. Among the many ramifications of the combined extraordinarily high values of caliper and dust capacity of the new filter media are its ability to provide a much thicker and therefore desirably stiffer filter web at a given basis weight, such web having, of course, outstandingly superior dust capacity to conventional filter sheets. Alternatively, it is feasible to reduce the weight of fiber in a sheet of given caliper, producing a sheet which still possesses a dust capacity superior to conventional filter sheets.

The example sheets of Table III were prepared using a single pulp fiber. More typically, however, in commercial practice a filter sheet will be comprised of a plurality of fibers with each contributing certain desired characteristics so that the filter media may be optimized for a given end use function

TABLE IV

| COMPARISIONS OF STANDARD AND NEW FILTRATION MEDIA | | |
|---|---|---|
| | Standard Furnish | Furnish with LCF Fiber |
| Pulp/% | HPZ/38.3 | LCF/75 |
| Pulp/% | W/VP/46.4 | W/VP10 |
| Pulp/% | Polyester/15.3 | Polyester/15 |
| Cured Basis Weight | 126 | 128 |
| Caliper, inch | 0.044 | 0.056 |
| Permeability, Frazier | 72.4 | 76.2 |
| MD Stiffness, mg | 5950 | 6800 |
| CD Stiffness, mg | 2500 | 2600 |
| MD Tensile, lb/inch | 22 | 18 |
| CD Tensile, lb/inch | 9.5 | 7.2 |
| Mullen, psi | 29 | 16 |
| Groove Depth, inch | 0.015 | 0.016 |
| Resin, % | 16 | 16 |
| Volatile, % | 5.6 | 6.0 |

TABLE IV-continued
COMPARISIONS OF STANDARD AND NEW FILTRATION MEDIA

|  | Standard Furnish | Furnish with LCF Fiber |
|---|---|---|
| Pulp/% | HPZ/38.3 | LCF/75 |
| Pulp/% | W/VP/46.4 | W/VP10 |
| Pulp/% | Polyester/15.3 | Polyester/15 |
| MFP, mm | 0.021 | 0.028 |

*Lignin Containing Fibers (LCF) produced according to the conditions of the invention.

TABLE V
COMPARISON OF THE FILTRATION PERFORMANCE OF STANDARD AND NEW FILTRATION MEDIA

|  | Standard | New (LCF) |
|---|---|---|
| Basis Weight lb/3000 ft.$^2$ | 126 | 128 |
| Pleat Width, inch | 4.022 | 4.218 |
| Pleat Height, inch | 0.75 | 0.75 |
| Pleats in Filter | 59 | 48 |
| Area in Filter, inches square | 356 | 304 |
| Caliper, inch | 0.044 | 0.056 |
| Groove Depth, inch | 0.012 | 0.015 |
| Filter Life, Hours | 15.7 | 20.9 |
| Dust Capacity of Filter, g | 34.8 | 45.9 |
| Dust Capacity, /mg Filter Media, g | 737 | 1122 |
| Dust Capacity, /sq. inch Filter Media, g | 0.0976 | 0.151 |
| Weighted Average Efficiency | 88.3 | 88.3 |

In Tables IV and V, there are set forth two different sheets of filter media, a control sheet utilizing high performance chemical fiber (Buckeye "HPZ") and a second sheet utilizing a similar (but not identical) combination of fibers in which the high performance chemical fiber was replaced entirely by lignin-containing fibers produced in accordance with the conditions of the invention (identified in Table IV and V as "LCF"), with changes in the proportions of the other fibers. In Table IV, the characteristics of the filter sheets were measured after the saturation of the sheet with phenolic resin and curing. In the sheet indicated in Tables IV and V, the pulp furnish for the control sheet included approximately 38.3% "HPZ", approximately 46.4% Westvaco softwood (Pinnacle Prime Pine), and approximately 15% polyester (DuPont Dacron, 0.25 inch long and 1.5 to 3.0 denier). In the comparison sheet, made with "LCF" fiber, the polyester fiber content was unchanged, the Westvaco softwood fiber content was reduced to 10%, and the remaining 75% of the furnish was made up of "LCF" lignin-containing fiber produced in accordance with the conditions specified by the invention.

The data presented in Table V demonstrate the superior caliper of paper made from "LCF" fiber. The control paper was found to be 0.044 inch thick while the paper made from the "LCF" fiber was found to be 0.056 inch thick. Since the two papers have the same basis weight, the void fraction of the paper made from the "LCF" fiber obviously was much greater than the void fraction of the control paper. Void fraction can be calculated from the equation:

$$V = 1 - (0.0000458 \text{ Basis Weight/Caliper}).$$

Using the equation, one finds that the void fraction of the control paper is 0.869 while the void fraction of the paper made by using the "LCF" fiber is 0.895. This difference in void fraction is related to the higher dust capacity of the paper made from an "LCF" containing furnish.

The performance of the two sheets of filter media is summarized in Table V. For this comparison, lube oil filter elements were made by pleating strips of the two papers. The element containing the control paper was made with the standard number of pleats, which is 59. The element made with the second paper, which contained the "LCF" fiber, contained only 48 pleats. Thus, the standard element containing the control paper had a filter surface area of 356 square inches while the element made with lignin-containing fiber has a surface area of only 304 square inches, an area reduction of about 15%.

In spite of the reduced filter surface area, the element containing the "LCF" fiber possessed a useful life of 20.9 hours while the element containing the control paper possessed a useful life of only 15.7 hours. This difference in dirt holding capacity between the control paper and the paper containing the "LCF" fiber is more impressive when one examines the dirt holding capacity on the basis of grams of dust per kilogram of filter media. When examined in this way, the element containing the paper made with "LCF" possesses a dirt holding ratio of 1126 g dirt/kg paper while the element containing the control paper possesses a dirt holding ratio of 738 g/kg. Thus, on the basis of equal weights of filter media, the element made with "LCF" fiber would hold 152% of the dirt held by a standard element made with the control fiber furnish. This fact is even more impressive when one learns that the paper chosen as the control for the example is a premium quality sheet which is used only in the highest performance lube oil filters.

The unique high caliper of paper made from a furnish containing "LCF" is of value in filtration products for the superior dirt holding capacity, as has been shown. The unique high caliper also benefits product runability on pleating lines and results in a desirable high stiffness in the finished product. Many filter products made from nonwoven webs such as paper are pleated prior to placement in a filter element, because pleating allows one to increase the filter area that is exposed to the fluid flow. Accordingly, one of the important characteristics of successful filter media is their ability to pleat. Experience has taught that the paper must possess a certain minimum caliper and stiffness if it is to run through commercial pleating equipment successfully. To a large extent, many filter products are made at the lowest basis weight that will pleat successfully. Papers made with a furnish containing the new "LCF" fiber are both thicker and stiffer than paper made from a furnish containing commercially available fiber. Thus, it is observed that paper made with a furnish containing "LCF" is superior in its pleatability because of the increased caliper and increased stiffness. It has also been observed that one can make a lower basis weight furnish which contains conventional commercially available fibers. Thus by using "LCF" fiber in a paper with a lower than standard basis weight one can produce a filter paper which pleats well, possesses equivalent or superior dust capacity, and possesses equal or superior paper stiffness.

Product stiffness is a very important characteristic of successful filter media. In a filter element which is filled with pleated filter paper, the ability of the media to withstand collapse due to hydraulic loading is related to the paper stiffness. The stiffness of a strip of paper is proportional to the thickness to the third power. Since the paper made from a furnish containing "LCF" fiber is thicker than paper made from conventional commercially available fibers, the stiffness is significantly improved.

Filter elements are usually evaluated on the basis of their dust capacity and their dust removal efficiency. The dust capacity of filters made of media containing "LCF" fiber has been shown to be significantly higher than the dust capacity of filters made of media containing conventional pulps. Filters made of media containing LCF fiber in accordance with the new present invention generally exhibit a dust capacity of at least 1460 g/kilograms. Indeed, filter media having a dust capacity of at least 2190, and even 2930 g/kg or more, can also be readily attained in accordance with the present invention. Such outstanding dust capacity demonstrates the unique applicability of the media of the present invention to filtration processes.

Generally, the filter efficiency of high dust capacity media is usually found to be lower than the filter efficiency of media with a lower dust capacity. This is not true, however, with filter elements made with the new "LCF" fiber. It is thought that the extra thickness, which is obtained with the "LCF" containing furnish, increases the length of the flow path. This provides a longer period of time for the particles to be within the web structure which, in turn, increases the probability of particle-to-fiber impaction and retention. Thus, it is found that the elements made with an "LCF" fiber containing media possess a particle removal efficiency that is equal to the efficiency of elements made with conventional fibers. Accordingly, filtration processes, for example, involving the filtration of air, lube oil, fuel or pharmaceuticals, by passing same through filtration media, are most efficient when the filter media of the present invention is employed.

In the manufacture of filters for commercial use, it is typical practice to combine a specific pulp mixture calculated to achieve desirable properties for a given end use. Typically, although not necessarily, the pulp mixture is prepared as a slurry, beaten sufficiently to assure uniform distribution, and then wet laid on a paper-making screen. Also typically, the wet web is dried and then impregnated with a binder resin. The resin, typically, is only partially cured by the web manufacturer. The ultimate filter manufacturer, usually converts the web material into a accordion pleat configuration, quite frequently forming a cylinder of accordion pleats accommodating a generally radial flow of the fluid media to be filtered. At this stage of production, the resin in the web material may be fully cured to provide a relatively permanent set to the manufacturer's configuration. Such a filter media structure comprising a cylinder of accordion pleats, and with media being impregnated with binder resin, is quite common in automotive filters, e.g. oil filters, fuel filters or air filters.

In a typical filter web intended for use as an auto air filter, for example, conventional pulp furnish may consist of approximately 60% high performance chemical pulp, such as "HPZ", and about 40% flash dried pine, such as Westvaco "Pinnacle Prime" softwood. It is contemplated that in such a filter furnish, a large portion, preferably all, of the "HPZ" component can be replaced by the lignin-containing fibers produced under conditions dictated by the invention. The resulting web product is of equal or superior performance. Indeed, the amazingly superior dust capacity of the new filter material is such that the overall filter life may be extended dramatically over existing products.

In a filter intended or use as a heavy-duty air filter in off-road vehicles, for example, a typical conventional furnish might comprise approximately 50% flash dried southern pine and approximately 50% flash dried hardwood, such as Westvaco "Pinnacle Prime" hardwood. It is contemplated that in such a furnish both of the flash dried components may be entirely or partially replaced by lignin-containing fibers derived under the conditions of the invention, thereby resulting in a filter product having significantly superior performance characteristics.

Several fiber furnishes are typically employed in the production of filter web for automotive oil filters. For long life, heavy-duty service, the typical furnish may be approximately 60% high performance chemical pulp, such as "HPZ", approximately 25% flash dried southern pine and approximately 15% polyester (DuPont Dacron, as previously described). A somewhat lower quality furnish consists of approximately 45% Alpha pulp, such as the before identified product of ITT Rayonier, approximately 50% flash dried southern pine, and approximately 5% polyester. A somewhat lower quality furnish consists of approximately 50% flash dried southern pine, approximately 45% flash dried hardwood and approximately 5% polyester. In the higher quality furnishes, the high performance chemical pulps ("HPZ", Alpha pulp) may be replaced substantially or entirely by the lignin-containing fiber pulp produced under conditions of the invention. In the lower quality furnish, the flash dried southern pine may be replaced substantially or entirely by the lignin-containing fibers. In the case of the higher quality furnishes, the substitution results in equal or even superior performance, whereas in the lower quality furnish, the substitution results in a dramatic increase in performance.

A typical automotive fuel filter furnish comprises approximately 60% flash dried southern pine and approximately 40% flash dried hardwood. In that furnish, the new lignin-containing fiber may be substituted for all or a substantial part of the flash dried southern pine with significant increase in filter performance.

Filters intended for pharmaceutical use typically may contain approximately 60% high performance chemical pulp, such as "HPZ" and approximately 40% cotton linters. The new lignin-containing fiber may be substituted for some or all of these components in such filter furnishes, with equal or better performance at dramatic cost savings.

In hydraulic and/or high efficiency fuel filters, a typical furnish may consist of approximately 30% alpha pulp and approximately 70% flash dried hardwood. The new fiber may be substituted for all or part of the alpha pulp component of such furnishes, with equal or better performance.

The above examples are intended to be illustrative, and not be any means limiting. It is anticipated that because of the coincidence of outstanding performance characteristics and favorable production cost which is achieved in filters using the lignin-containing fiber produced under conditions of the invention, that filter media will be designed and constructed to maximize use of the new filter, and it is contemplated that filter furnishes and filter media may be constituted exclusively of the new fiber in some instances.

One of the important economic advantages realized by the invention is derived from the extremely high yield of fiber from the Asplund-type pulping procedure. Thus, fiber yield may be as high as 95% of the dry wood starting material as compared to chemical processes for high performance pulp, which yield as little as 35% useable fiber. To a large extent, this results from the fact that the fiber output of the pulping process retains substantially all of the lignin and hemicellulose content of the original unpulped fiber source. The chemical processes, on the other hand, substantially remove lignin and hemicellulose, which results in an immediate loss of yield. Moreover, because of the essentially fragile nature of the resulting fiber product, additional significant losses occur throughout subsequent processing. The presence of the lignin and lignin related materials in the fiber output is significantly advantageous in the ultimate filter media when the fiber production has been achieved under the conditions of the invention. Thus, under proper pressure and temperature conditions, the lignin materials are in a plasticized state during the refining operation, which not only enables a relatively long, relatively undamaged fiber to be produced, but the resulting fiber is extremely stiff and tough, relatively straight and has a very smooth outer surface free of fibril formation. This structure is ideal for filter media utilization as it exhibits exceptionally low bonding characteristics and, because of its structure resembling "uncooked spaghetti", results in an extremely porous, bulky media when laid in random form, for example, as by wet laying or air laying. Directly related to the high bulk characteristic, is an extremely high freeness, in the area of 760 and above. This equals or exceeds the freeness of the highest quality high performance chemical pulps.

Filter media prepared in accordance with the invention, being characterized by extremely high bulk and extremely high freeness, have correspondingly exceptional dust capacity, which is a standard measure of useful working life of a filter media. A filter media manufacture, utilizing a portion of the new lignin-containing fiber in a filter furnish, has a great deal of production flexibility. Because of the exceptional bulk of the pulp fiber, it is possible to produce filter media of equivalent physical characteristics, with equal or superior performance, using web material of significantly lower basis weight than before. Alternatively, significant improvement in performance can be realized utilizing web materials of similar basis weight. As will be evident, this flexibility enables the manufacturer to exert a wide degree of control over production cost/performance characteristics relationships.

Although the lignin-containing fiber produced according to conditions of the invention has a relatively low fiber bond strength characteristic, the loss of strength is exceeded by the increase in dust capacity such that at any given level of dust capacity a filter media according to the invention will have greater strength than a conventional filter media.

One other significant characteristic of the lignin-containing pulp fiber derived from the invention is its substantial stiffness. This minimizes fiber deformations during lay-up and any subsequent pressing or other operations, assuring that the final media has and retains a very high bulk characteristic. Moreover, the character of the fiber after discharge from the disc refiner and subsequent screening is such that secondary refining is not necessary. But where it is desirable to refine a furnish which is a blend of different fibers, the lignin-containing fiber will be found to be less damaged than commercially available high performance chemical fiber.

Perhaps because of their high retained lignin content, the pulp fibers produced under the conditions of the invention remain highly active, chemically. This facilitated bleaching or other chemical modification of the pulp, which may be desirable for certain applications, such as automotive air filters, for example, where the darkening of a white filter web media with use gives an indication of need for replacement.

Filter media constructed according to the invention also is characterize by an extremely high void fraction, resulting in a media which has an extremely high permeability.

Filters made of a web media containing LCF fiber in accordance with the present invention generally exhibit a void fraction of at least 0.80, with void fractions of at least 0.85 and most preferably even at 0.89 or more also being readily attainable. Such a high void fraction is of course desirable in a filter media as permeability is a measure of the ease with which a gas or liquid is capable of passing through the media. Void fraction also imparts to the media an unusually high ability to absorb and hold large volumes of fluid.

While one of the most advantageous uses for the new pulp is in the production of filter media, the unique fiber structure and other characteristics of the pulp make it useful to advantage in other products, for example, products in which low apparent density is a desirable characteristic. Examples of such are non-metallic liner, blotting material, saturating gasket, endcap and edge filter, battery board and matrix board. In addition, there are many other specialty paper products which may utilize to advantage the high bulk and other physical and chemical characteristics of the pulp. Examples of these further products are: towelling, release bases, baking pan liner, coaster materials, mat board, file folder, press pad, vacuum bag, saturating krafts, battery separator material, shoeboard, album, cap board, die wipe, speaker cone, contruction paper, and mounting board. The new pulp fiber also contains a high degree of chemical reactivity, which can be taken advantage of in certain later processing operations.

The stiffness and toughness of the smooth, lignin coated fiber of the new pulp material gives important advantages in the various processing operations that may be required. For example, if the pulp is to be dewatered and bailed for market pulp, the pulp fibers suffer minimum degredation while being pressed to remove water and in the subsequent fiber handling. Likewise, where the fiber is used in the formation of wet material by wet-laying processes, both the fiber structure and the uniquely high bulk characteristic of the wet material are little affected by wet pressing operations. The lignin coated fibers of the new pulp material can also be heat pressed, at a temperature sufficiently high to cause some flow and rearrangement of hemicelluloses and lignin, and enabling the fibers to be bonded to form a stiff, board-like structure.

Although the invention has been described with reference to preferred embodiments, it is to be understood that variations and modifications may be resorted to as will be apparent to those skilled in the art. Such variations and modifications are to be considered within the preview and the scope of the claims appended hereto.

What is claimed is:

1. An improved, high bulk, fibrous filter material for the filtration of fluid media comprising
    (a) a substantial fraction of lignin-containing fibers derived from the disc refining in substantially dry condition of substantially undelignified lignin-containing material having a lignin content of at least 10%, under steam pressures in the range of about 90 psig to about 120 psig, at temperatures in the range of from about 330° F. to about 350° F., and using energy levels in the range of from about 8 to about 35 HPD/ADT, (b) said lignin-containing fibers being characterized by having most of their original lignin content and by having a smooth wall structure, substantially free of fiber-bonding surface fibrils being substantially non-self-bonding to adjacent like fibers in the absence of elevated temperatures, and having a freeness of at about 725 ml (CSF), and (c) said fibrous material being formed into a random-laid sheet-like structure having a dust capacity of at least about 1460 g/kg.

2. The filter material as defined in claim 1 wherein
   a. said lignin-containing fibers are present in amounts of about 30% or more in combination with other fibers,
   b. said other fibers comprising at least in part fibers from flash dried softwood, flash dried hardwood pulp, alpha pulp, or synthetic fiber, or combinations thereof.

3. The filter media as defined in claim 2, wherein
   a. said lignin-containing fibers are capable of passing through circumferentially aligned slots of a rotary screen, in which the slots have a width of about 6 mils, and
   b. said fibers have a size distribution such that approximately 60% is retained on a 28 mesh screen.

4. The filter media as defined in claim 1, wherein
   a. the filter media has a void fraction of at least 0.85.

5. The filter media as defined in claim 1 or 4, wherein
   a. the filter media has a dust capacity of at least 2190 g/kg.

6. In an automotive-type filter comprising an oil filter, fuel filter or air filter with the filter media thereof being in theform of a cylinder of accordian pleated web material and with said filter media being impregnated with a binder resin, the improvement which comprises
   a. said web material being in the form of a random-laid web and comprising a substantial fraction of lignin-containing fibers derived from the disc refining of substantially undelignified lignincontaining material having a lignin content of at least 10%,
   b. said material being refined in a substantially dry state under steam pressures in the range of about 90 psig to about 120 psig, at temperatures in the range of from about 330° F. to about 350° F., and using energy levels in the range of from about 8 to about 35 HPD/ADT,
   c. said lignin-containing fibers being characterized by having most of their original lignin content and by having a smooth wall structure, substantially free of fiber-bonding surface fibrils and being substantially non-self-bonding to adjacent like fibers in the absence of elevated temperatures, and
   d. said lignin-containing fibers havng a freeness of not less than about 725 (CSF).

7. The automotive-type filter defined in claim 6, wherein
   a. said web material has a void fraction of at least 0.80 and has a dust capacity of at least 1460 g/kg.

8. The automotive-type filter defined in claim 7, where
   a. said web material has void fraction of at least 0.89 and has a dust capacity of at least 2190 g/kg.

9. The automotive-type filter defined in claim 6, wherein
   a. said lignin-containing fibers are present in amounts of about 30% or more and in combination with other fibers,
   b. said other fibers comprising at least in part fibers from flash dried softwood, flash dried hardwood pulp, alpha pulp, or synthetic fiber, or combinations thereof.

10. The automotive-type filter defined in claim 6, wherein
    a. said lignin-containing fibers are capable of passing through circumferentially aligned slots of a rotary screen, in which the slots have a width of about 6 mils, and
    b. said fibers have a size distribution such that approximately 60% is retained on a 28 mesh screen.

11. In a process of filtration of a liquid or gaseous medium comprising passing the liquid or gaseous medium to be filtered through filter media, the improvement which comprises
    a. passing the liquid or gaseous medium through a random-laid sheet-like mass of high bulk, fibrous filter material which comprises a substantial fraction of lignin-containing fibers derived from the disc refining in a substantially dry state of substantially undelignified lignin-containing material having a lignin content of at least 10%, under steam pressures in the range of about 90 psig to about 120 psig, at temperatures in the range of from about 330° F. to about 350° F., and using energy levels in the range of from about 8 to about 35 HPD/ADT,
    b. said lignin-containing fibers being characterized by having most of their original lignin content, by having a smooth wall structure, substantially free of fiberbonding surface fibrils and being substantially non-self-bonding to adjacent like fibers in the absence of elevated temperature, and
    c. said lignin-containing fiber fraction having a pulp freeness of at least about 725 (CSF).

12. The process of filtration defined in claim 11, wherein
    a. said lignin-containing fibers are present in amounts of about 30% or more and in combination with other fibers,
    b. said other fibers comprising at least in part fibers from flash dried softwood, flash dried hardwood pulp, alpha pulp, or synthetic fiber, or combinations thereof.

13. The process of filtration defined in claim 12, wherein
    a. said lignin-containing fibers comprising the filter media are capable of passing through circumferentially aligned slots of a rotary screen, in which the slots have a width of about 6 mils, and
    b. said fibers have a size distribution such that approximately 60% is retained on a 28 mesh screen.

14. The process of filtration-defined in claim 11, wherein
    a. said lignin-containing fibers comprising the filter media are combined with other paper-making type fibers and then randomly laid to form a continuous web,
    b. said web then being impregnated with sufficient binder resin to accommodate handling and forming, and
    c. said web having a void fraction of at least 0.80 and a dust capacity of at least 1460 g/kg.

15. The process of filtration-defined in claim 14, wherein
    a. said other paper-making type fibers include any one or more of polyester, cotton liners, or flash dried hardwood.

* * * * *